Figure 1:
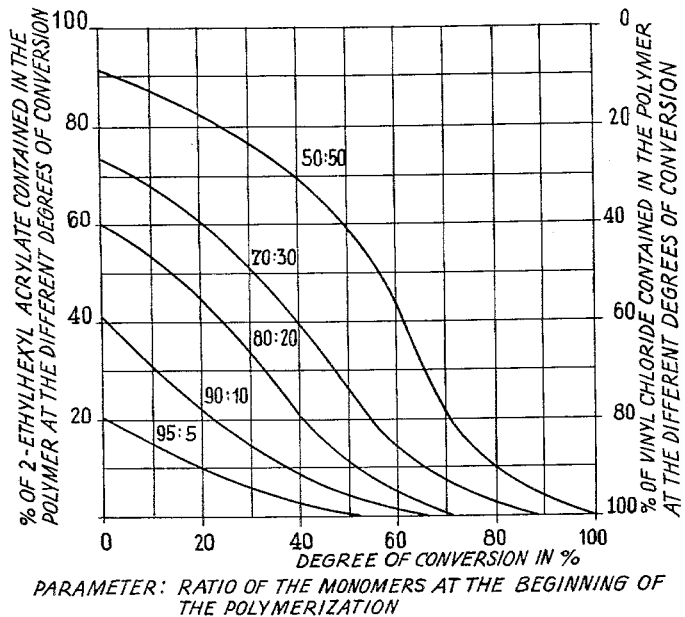

PARAMETER: RATIO OF THE MONOMERS AT THE BEGINNING OF THE POLYMERIZATION

INVENTORS
WALTER ALBERT
LOTHAR BOHN
HERMANN OBERST
EBERHARD PASCHKE
HORST PFISTER

United States Patent Office 3,230,206
Patented Jan. 18, 1966

3,230,206
PROCESS FOR THE MANUFACTURE OF COPOLYMERS HAVING AN EXTREMELY HETEROGENEOUS STRUCTURE
Walter Albert, Lothar Bohn, Hermann Oberst, Eberhard Paschke, and Horst Pfister, all of Frankfurt am Main, Germany, assignors to Farbwerke Hoechst Aktiengesellschaft vormals Meister Lucius & Brüning, Frankfurt am Main, Germany, a corporation of Germany
Filed Nov. 15, 1960, Ser. No. 69,409
Claims priority, application Germany, Nov. 18, 1959, F 29,876
2 Claims. (Cl. 260—86.3)

The present invention relates to a process for the manufacture of copolymers having an extremely heterogeneous structure.

A number of homopolymers and copolymers of olefinic compounds, which polymers possess a great variety of mechanical properties are known in industry.

For example, hard and relatively inflexible polymers may be prepared which may be worked up alone or in admixture with a plasticizer. Alternatively, by an appropriate choice of the monomers, polymers that are flexible and resistant to impact in the cold may be prepared.

It is, for example, possible to prepare hard synthetic resins of a great thermal stability under load by homopolymerizing vinyl chloride or acrylonitrile or other monomers. The polymers that are thus obtained are distinguished by a high thermal stability under load and a high tensile strength. They have, however, the grave drawback of having a poor elongation at break, a poor impact strength in the cold and a poor workability.

On the other hand, for example, homopolymers of acrylic acid esters of alcohols of higher molecular weight possess a good flexibility, a good impact strength in the cold and a good workability but they have a poor thermal stability under load and a poor tensile strength.

Rather early attempts have been made to improve the undesired properties of the above-mentioned homopolymers without considerably impairing their desired properties, by subjecting them to an external plasticization. For this purpose monomeric, oligomeric or polymeric plasticizers were added to hard polymers. This measure enabled various new, interesting properties to be conferred, for example, upon polyvinyl chloride by means of monomeric aromatic or aliphatic dicarboxylic acid esters of alcohols of higher molecular weight or aromatic phosphoric acid esters. In this way it was, however, not posisble to impart to the polyvinyl chloride, in addition to its good thermal stability under load and its good tensile strength, a good elongation at break and a good impact strength in the cold. Besides, polyvinyl chloride containing additives of the above-mentioned kind often exhibits the technically undesired effect of migration of the plasticizer, so that, due to the loss of plasticizer, articles made from polyvinyl chloride containing such additives become brittle or unattractive on heating or in the presence of solvents.

In order to overcome this drawback of the monomeric plasticizers, oligomeric or polymeric plasticizers have been used in their place. A suitable plasticizer of this kind is, for example, the propylene glycol polyester of sebacic acid which has a molecular weight of about 3000. But since this plasticizer is expensive and difficult to admix with the polymer, plastics of polyvinyl chloride resins plasticized in this manner have only rarely been introduced into practice. What has been said above with respect to the mechanical properties of the products which have been worked up with monomeric plasticizers applies as well to the mechanical properties of products which have been worked up with oligomeric or polymeric plasticizers. The above-mentioned economical facts, too, are applicable when polyacrylic acid esters of alcohols of higher molecular weight are used for external plasticization. Besides, in this case the characteristic features of polymer mixtures are already obvious. By mixing a polymeric substance which is stable at elevated temperatures under load, for example polyvinyl chloride which serves as basic resin, with a polymer that is resistant to impact when cold, for example, a polyacrylic acid ester serving as plasticizing component, it is, for example, possible to impart a certain impact strength to the cold polyvinyl chloride without impairing its thermal stability under load. However, because of the relatively poor compatibility of the two components of the mixture, such a polyvinyl chloride is susceptible to cracks. Also the cold impact strength of such a polyvinyl chloride lies within a range that is industrially uninteresting. Moreover, the tensile strength of such a substance is reduced and the elongation at break is not considerably increased. When the compatibility of the plasticizing component with the basic resin which is stable on heating under load is improved by the use of, for example, a copolymer of vinyl chloride and 2-ethyl hexyl acrylate as plasticizing component, the impact strength in the cold, the elongation at break and the tensile strength are improved as compared to the mixture of pure homopolymers, while the thermal stability under load of the basic resin remains unchanged. However, by operating in this manner it is very difficult to obtain products having suitable values which are reproducible. When the polymeric components of the mixture are mixed, for example, on a mixing roller, their mixing is incomplete because of their different viscosities at the processing temperatures, so that a certain susceptibility to cracks remains and this inevitably leads to irreproducible effects.

Another possibility for combining the mechanical properties of homopolymers which are stable at elevated temperatures under load with those of homopolymers which have a high impact strength resides in a graft polymerization which is usually carried out in an aqueous dispersion or in solution. The drawback of a graft polymerization in the aqueous phase lies in the relatively poor graft reaction which cannot be controlled and which is consequently very difficult to reproduce. When the graft polymerization is carried out in solution a larger proportion of graft polymer is obtained and, besides, the reaction can more easily be controlled. However, because of the considerable outlay on plant, the process is not economical, so that neither of the processes has hitherto been applied in practice.

Another important way of preparing polymers having, on the one hand, a high thermal stability under load and a great tensile strength and, on the other hand, a good impact strength in the cold and a good elongation at break is to copolymerize two or more monomers, one of which has a high second order transition temperature as homopolymer and consequently possesses a high thermal stability under load and a high tensile strength, and another of which has a low second order transition temperature as homopolymer and is consequently characterized by a good impact strength in the cold and a good elongation at break.

It is not at all immaterial with respect to the mechanical properties which pair of monomers is chosen for the copolymerization. The polymerization process used is likewise of importance. When a plasticizing monomer is used which polymerizes more quickly than the monomer constituting the basic resin, the properties of the copolymer obtained are entirely different from the properties of a copolymer obtained with the use of the plasticizing monomer which polymerizes at the same speed, as or more slowly than, the monomer constituting the basic resin.

These characteristic differences in the mechanical behaviour of the copolymers become especially evident when the polymerization is carried out in the presence of protective colloids and activators that are soluble in the monomer. When the polymerization is carried out in the presence of an emulsifier and a water-soluble activator, the properties of the copolymers obtained with the use of a plasticizing monomer which polymerizes more quickly than the monomer constituting the basic resin are similar to the properties of the copolymers obtained with the use of the plasticizing monomer which polymerizes at the same speed as, or more quickly than, the monomer constituting the basic resin.

According to the classical view concerning the preparation of copolymers, it was endeavoured to incorporate the plasticizing monomer as uniformly as possible with the copolymer. That is to say, products were prepared whose chemical structure was to a large extend homogeneous. On closer examination of those so-called internally plasticized copolymers it became, however, evident that the mechanical properties were proportional to the relative proportions of basic resin and plasticizing monomer. That is to say, average mechanical values were obtained which did not at all match the increase of impact strength in the cold, the elongation at break and the conservation of thermal stability under load and tensile strength which were expected. The behaviour of the products is substantially like that of externally plasticized homopolymers. They have the advantage of not exhibiting the phenomena of a migration of the plasticizer but their mechanical values are not satisfactory for many fields of application. For this reason they have only been used in special fields.

An approximation to the desired values was attained by using a pair of monomers, of which the monomer constituting the plasticizing component polymerized more quickly than the monomer constituting the basic resin, and by subjecting this pair of monomers to a suspension polymerization process carried out in the presence of protective colloids and activators that were soluble in the monomer. This method enabled copolymers to be obtained which contained 20% or more of plasticizing monomers and had a good tensile strength, a good elongation at break and a good impact strength in the cold. The thermal stability under load of such products was, however, rather mediocre. Copolymers containing a small proportion of plasticizing monomer, on the other hand, have a good thermal stability under load, a good elongation at break and a good tensil strength but their impact strength in the cold leaves much to be desired. The dependence of the mechanical properties of on the ratio of the monomers is a function of the different relative reactivity of the monomers in the mixture of monomers ($r$-values).

Figure 2:
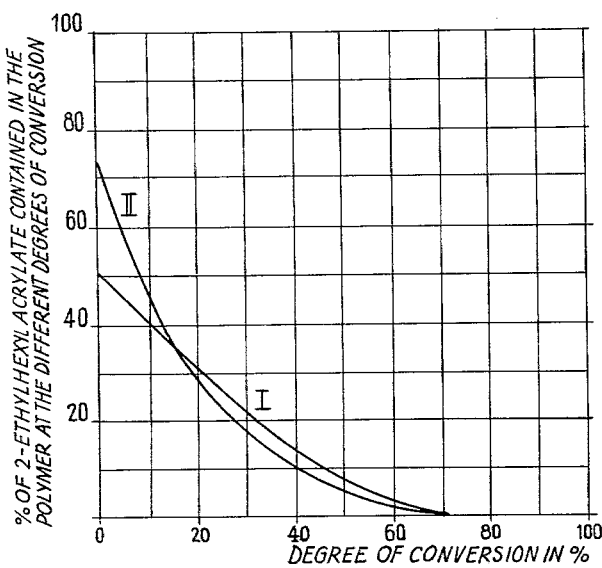

In the accompanying drawings the aforesaid facts are shown diagrammatically by way of example. FIGURE 1 represents the composition of the copolymer as a function of the ratio of the monomers and the time in a single-batch polymerization process. FIGURE 2 illustrates the course of a single-batch polymerization process (curve I) and the course of the polymerization according to the invention (curve II).

The plurality of curves given in FIGURE 1 shows the influence of the ratio of the monomers and the $r$-values of the pair of monomers on the structure of the copolymer. As example a copolymer of vinyl chloride and 2-ethylhexyl acrylate was chosen, the homopolymer of the vinyl chloride having a high second order transition temperature and the homopolymer of the 2-ethylhexyl acrylate having a low second order transition temperature. The use of 2-ethylhexyl acrylate is especially indicated because as homopolymer it has the lowest second order transition temperature of all acrylic acid esters.

By second order transition temperature is to be understood the temperature at which a high polymer loses its brittle glass-like character and acquires softer, so-called viscous-elastic (in the case of cross-linking, rubber-elastic) characteristics. This temperature is in general determined by dilatometrically measuring the sudden change in the coefficient of thermal expansion occurring at the second order transition temperature. In many cases the second order transition temperature is also determined by way of the sudden decrease in the impact or notched bar impact strength occurring as the temperature is lowered ("brittle point") or by way of the strongly marked modifications of hardness and elastic moduli which are dependent on temperatures. (For particulars, see H. A. Stuart, "Die Physik der Hochpolymeren," volume 3, Springer, 1955, Chapters X and XI, table concerning the second order transition or brittle temperature of various plastics, page 667. Confer also C. E. Schildknecht, "Polymer Processes," Interscience Publishers, N.Y. 1956, pages 637 and 638, in particular Figure 2.)

It can be seen from the curves that, when the content of acrylate in the monomer mixture is 20% or more than 20%, there is first formed a copolymer which contains a large proportion of acrylate, which is the reason for the high impact strength in the cold of products of this kind. Since, however, for reasons of economy, polymerization is in most cases only continued until a conversion of 85% has taken place, there is still produced at the end of the polymerization a large portion of a copolymer which, however, contains but a small proportion of acrylate. Since it is furthermore known from the preparation of polymer mixtures in which the basic resin is, for example, polyvinyl chloride, that the thermal stability under load is a function of the proportion of polyvinyl chloride, the fact that the thermal stability under load of copolymers containing a large proportion of acrylate is entirely insufficient is also explicable. An essential improvement of the thermal stability under load is brought about by reducing the proportion of acrylic acid ester in the monomer mixture to 17% or less than 17%, since in that case only small portions of acrylate are incorporated with the copolymer in the last third or the second half of the polymerization. Due to the low proportion of copolymer containing a large proportion of acrylate and having a low second order transition temperature, the impact strength in the cold is poor in this case. Since copolymers of this kind have an insufficient thermal stability under load and no impact strength in the cold, the method described above also does not enable a product having optimum properties to be obtained, although the mechanical properties may be sufficient for some purposes.

Mixtures of polymers of different second order transition temperatures (polyblends) have an extreme heterogeneity. However, there is no portion forming a continuous transition in the composition of these mixtures which would render the polymers more compatible with one another. Consequently the elongation at break and the impact strength in the cold as well as the reproducibility of these values are often insufficient in this class of polymer blends.

The present invention provides a process for the preparation of copolymers of an extreme heterogeneity, according to which two or more monomers, at least two of the plastic-like homopolymers of which differ in their second order transition temperature by 10° to 200° C., preferably 50° to 150° C., are copolymerized in such a manner that the following portions of polymer form:
(1) 5 to 50%, preferably 10 to 40%, of a portion of polymer in which the content of the component or components, the homopolymer or homopolymers of which has or have the lower second order transition temperature, is larger than would correspond to the gross composition of the total copolymer, and which consequently has a relatively low second order transition temperature;
(2) 10 to 90%, preferably 30 to 80%, of a portion of polymer in which the content of the component or components, the homopolymer or homopolymers of which has or have the lower second order transition temperature, is smaller than would correspond to the gross composition of the total copolymer, and which consequently has a relatively high second order transition temperature; and (3) a polymer portion having a variable composition, the constituents of which have any composition and second order transition temperatures between those of the two aforesaid polymer portions.

This desired extreme heterogeneity of structure can be realized by various methods. It is of decisive importance to know the relative speed of polymerization of the monomers that are to be used.

When the plasticizing component is a monomer which as homopolymer has the desired low second order transition temperature and which polymerizes more quickly than the monomer constituting the basic resin, it is generally sufficient first to prepare a quantity of about 10 to 40% of a coplymer having the desired low second order transition temperature by placing a certain monomer mixture, which differs in its composition from the final composition of the polymer by the fact that it has been enriched with plasticizing monomer, into the polymerization vessel, and polymerizing this monomer until the desired proportion of a polymer having a second order transition temperature below 20° C., preferably below 0° C., has formed. Then the remaining portion of the monomer is introduced either at one time or in portions or continuously into the polymerization vessel. The total quantity of plasticizing monomer and part of the monomer constituting the basic resin may be placed into the polymerization vessel and polymerized until the desired degree of conversion has been attained or, alternatively, only a part of the plasticizing monomer and a part of the monomer constituting the basic resin may first be polymerized and the remaining monomer mixture may be added to this batch after a certain degree of conversion has been attained. Because of the higher speed of polymerization of the plasticizing monomer, a continuously variable transition in the composition with respect to the portion of basic resin occurs automatically.

Things are quite different when for certain reasons it is desired to use in the copolymerization process a plasticizing monomer having the same or a lower speed of polymerization than the monomer constituting the basic resin. The desired heterogeneous structure can then be brought about only by adjusting the ratio of the monomers during the polymerization. In this case, too, there is first prepared a copolymer having the desired low second order transition temperature and containing a proportion of plasticizing monomer which is larger than that which would correspond to the final composition of the copolymer. The transition to the hard portion of polymer does, however, not occur automatically in this case but must be brought about by the addition of constantly increased quantities of hardening monomer.

Polymerization processes of the aforesaid kind are usually controlled by taking off samples at certain intervals during the polymerization, determining the degree of conversion and analysing the composition of the polymer.

Thus, by choosing monomers having the desired speed of polymerization and yielding homopolymers of the desired second order transition temperature and by carrying out the polymerization according to the invention, those skilled in the art can prepare copolymers which, within the range of second order transition temperatures of the homopolymers, contain hard and soft polymer components which confer upon the polymer, in the desired temperature ranges, thermal stability under load and tensile strength on the one hand and impact strength and elongation at break on the other hand.

Copolymers having such an extremely heterogeneous structure can be prepared by block-, solution-, suspension- or emulsion-polymerization, suspension polymerization being preferred in the industry when a polymerization powder having good flow properties is to be prepared.

It has been found that in the suspension polymerization process the polymers are first obtained in the form of small particles, so-called primary particles, which have an average diameter of about 0.1 to $1\mu$. When the suspension polymerization is carried out in the presence of protective colloids and activators that are soluble in the monomer the primary particles form in the monomer droplets having a diameter of about 10 to $250\mu$. Since the activators are dissolved in the monomer, polymerization takes place to a large extent in the said monomer droplets, so that the polymer particles of heterogeneous composition are mixed already when having the size of primary particles. This ensures a good reproducibility of the mechanical properties of the polymers. Since, besides, at the end of the polymerization according to the invention it is practically only the monomer yielding the basic resin that is polymerized, each of the beads that form has the same composition in its exterior shell, so that each polymer bead is compatible with the other.

In order to realize the present invention there may be prepared copolymers consisting (a) of vinyl ethers and/or acrylic acid esters and/or methacrylic acid esters and/or maleic acid esters of alcohols containing 4 to 12 carbon atoms and/or butadiene and (b) of vinyl esters of carboxylic acids containing 2 or 3 carbon atoms and/or acrylic acid esters and/or methacrylic acid esters of alcohols containing 1 to 3 carbon atoms and/or acrylonitrile and/or vinyl chloride and/or vinylidene chloride and/or styrene and/or vinyl carbazole. Alternatively, copolymers may be prepared all the components of which belong either to group (a) or to group (b), provided that the difference between the second order transition temperatures of the plastic-like homopolymers of the components within the desired temperature range is sufficiently great. Acrylic acid esters, especially 2-ethylhexyl acrylate, are particularly suitable for use in carrying out the copolymerization according to the invention with vinyl chloride. The copolymers of vinyl chloride and 2-ethylhexyl acrylate which are prepared by the process according to the invention possess the desired harmony in their mechanical properties, an excellent workability, a good thermostability and a very good fastness to light and weathering. As third component a vinyl ester such as vinyl acetate, vinyl butyrate or ethyl caproic acid vinyl ester or a maleic acid ester such as dibutyl maleinate may be incorporated by polymerization.

For the polymerization there are generally used radical-forming activators such as hydrogen peroxide, acetyl peroxide, lauroyl peroxide, benzoyl peroxide or persulfates. There may also be used azo-compounds such as azo-di-iso butyric acid nitrile. Each of these activators may be used alone or in combination with other activators.

When operating in an aqueous medium it is suitable to use surface-active substances, for example, protective colloids, emulsifiers or wetting agents, in order that the polymers according to the invention may be prepared in an industrially unobjectionable manner. The surface-active substance may be of non-ionic, cationic, anionic or amphoteric nature.

When an acrylic acid ester is used as plasticizing monomer and vinyl chloride is used as the monomer constituting the basic resin and the polymerization process used is the suspension polymerization process, the process according to the invention is carried out, for example, in the following way: an aqueous medium of about 100 parts of water (these and all following parts being by weight) is suitably prepared in a polymerization vessel which is resistant to pressure and provided with a stirrer and 0.01 to 0.2 part of a protective colloid, for example, alkyl cellulose, polyvinyl alcohol or gelatin, and 0.01 to 0.1 part of an emulsifier are dissolved in the said aqueous medium. All the acrylate of the monomer mixture, the total quantity of which mixture may amount to about 10 to 80 parts and which consists of about 30 to 95% by weight of vinyl chloride and about 70 to 5% by weight of acrylate, or the major part of the acrylate, is introduced into the polymerization vessel together with such an amount of vinyl chloride that the ratio of vinyl chloride to acrylic acid ester in this part of the monomer mixture is smaller than 9 and preferably smaller than 5. At the same time 0.05 to 1 part of an activator that is soluble in the monomer is added. Polymerization is initiated by heating to a temperature within the range of about 30° to 80° C., preferably 40° to 64° C., and after an extent of conversion of at least 5%, preferably 20%, calculated on the total quantity of the monomer, has been attained, the remaining portion of vinyl chloride or the remaining monomers is or are introduced at one time or in the course of a prolonged period. The above polymerization temperature is maintained until the desired degree of conversion has been attained which in general is at about 85%. Polymerization is then interrupted in known manner, for example, by cooling or by the addition of a stopping agent, and the polymer is separated from the aqueous medium.

Owing to the fact that the speed of polymerization of the acrylic acid ester is greater than that of the vinyl chloride, a copolymer according to curve I of FIGURE 2 is obtained by suspension polymerization when the total quantity of both monomers is placed into the polymerization vessel before the beginning of the polymerization. When, on the other hand, the polymerization is carried out in the manner described above a polymer composition according to curve II of FIGURE 2 is obtained.

In order that a good notched bar impact strength at 0° C. be imparted to the material of polyvinyl chloride, it is necessary that it contain about 10% of polymer portion having a medium second order transition temperature of 0° C.

The copolymer according to curve I of FIGURE 2 contains a portion of a medium composition of 60 parts of vinyl chloride and 40 parts of plasticizing monomer, for example, an acrylic acid ester, which portion has been formed by conversion of up to 20%. This copolymer has a second order transition temperature of 15° C., so that at a temperature of 0° C. only a relatively small portion of material which is on the point of freezing is available to reduce tension when the material is exposed to impact. From a consideration of that portion of copolymer according to curve II of FIGURE 2 which has formed by a conversion of up to 20%, it follows that this copolymer on an average contains 50 parts of plasticizing monomer. The second order transition temperature of this substance is at 0° C., so that in this case a sufficiently large portion of material that is about to freeze is available to reduce the tension produced by impact. Due to this portion of material of a low second order transition point, the other mechanical properties, such as tensile strength and elongation at break, are improved at the same time while the thermal stability under load is preserved.

Table I reports characteristic mechanical properties of the copolymer corresponding to curve I of FIGURE 2 (copolymer prepared from 86% of vinyl chloride and 14% of 2-ethylhexyl acrylate in the manner described in the example given below with the difference that the total quantity of monomers was introduced before the commencement of the polymerization) and, for purposes of comparison, of the copolymer corresponding to curve II (copolymer according to the example given below) of FIGURE 2.

TABLE

| | I | II |
|---|---|---|
| Tensile strength in kg./cm.² | 325 | 378 |
| Elongation at break in percent | 95 | 179 |
| Notched bar impact strength at 0° C. in kg. cm./cm.² | 6 | 12 |
| Thermal stability under load according to Vicat in ° C. | 66 | 64 |

When another one of the monomer combinations or polymerization processes mentioned in this specification is used the process of the invention can be modified accordingly. The measures which must be taken to modify the method described for suspension polymerization so that it can be applied to a polymerization carried out, for example, in solution or in an aqueous emulsion are known to those skilled in the art and can be taken, for example, from the books "Polyvinylchlorid und Vinylchlorid-Mischpolymerisate" by F. Kainer (Springer-Verlag, Berlin/Göttingen/Heidelberg, 1951) and "Polymerisationskinetik" by L. Küchler (Springer-Verlag, Berlin/Göttingen/Heidelberg, 1951). The same applies to the use of monomers other than vinyl chloride and acrylic acid esters, which have been mentioned above.

In cases in which the plasticizing monomer polymerizes more slowly than the monomer constituting the basic resin, for example, in the copolymerization of vinyl chloride and a vinyl ester such as vinyl acetate, a monomer mixture in which the proportion of the plasticizing monomer is larger—amounting, for example, to 50 to 95%—than in a monomer mixture used in a case in which the plasticizing monomer polymerizes quickly, is to be placed into the polymerization vessel before the commencement of the reaction. After an extent of conversion of at least 5 to 20%, calculated on the total quantity of the monomers, has been attained care has to be taken that the remaining portion of monomers, in particular that of the monomers constituting the basic resin, is first added in small portions and then in the further course of the polymerization, in increased portions.

The following example serves to illustrate the invention but it is not intended to limit it thereto.

*Example.—Suspension polymerization of vinyl chloride and 2-ethylhexyl acrylate*

22.5 liters of de-salted water,
3.9 kilograms of methyl cellulose solution of 1% strength,
5.8 grams of the sodium salt of di-tertiary-butyl-naphthalene-sulfonic acid.
32.5 grams of lauroyl peroxide,
32.5 grams of azo-di-isobutyric acid nitrile and
1.625 kilograms of 2-ethylhexyl acrylate were introduced into a polymerization autoclave having a capacity of 40 liters. The vessel was three times alternately evacuated and filled with nitrogen. Then 3.6 liters of vinyl chloride were pumped into the evacuated vessel, stirring was ceased and the vessel was heated to the polymerization temperature of 45° C. During the polymerization the internal temperature of the vessel was kept constant. When the temperature in the vessel had risen to 45° C., 8.95 liters of vinyl chloride were continuously pumped in during the first two hours, the pressure in the vessel rising from 5.0 to 6.0 atmospheres (gage). Polymerization of the batch was then continued until the pressure had fallen to 2.5 atmospheres (gage). The polymerization lasted 16 hours. The polymer was cooled, degassed, separated from the aqueous phase, washed and dried. The polymer was obtained in a yield of about 85%, it contained 48.7% of chlorine and had a K value of 77.

We claim:
1. A method for the manufacture of a copolymer having improved thermal stability under load and improved low temperature impact strength from a total quantity of monomers consisting essentially of 30–95 percent by weight of vinyl chloride and 70–5 percent by weight of 2-ethylhexyl acrylate, which process comprises copolymerizing all of said acrylate ester in an aqueous phase with a portion of vinyl chloride, the weight ratio of vinyl chloride to said ester being below 9 but greater than zero, until 5–20 percent by weight of said total quantity of monomers is polymerized, then adding the remaining portion of said vinyl chloride to the aqueous phase and continuing the polymerization until about 85 percent by weight of said total quantity of monomers is polymerized.

2. A copolymer prepared as in claim 1.

References Cited by the Examiner

UNITED STATES PATENTS

| | | | |
|---|---|---|---|
| 2,746,944 | 5/1956 | Napps et al. | 260—86.3 |
| 2,777,836 | 1/1957 | Everard et al. | 260—86.3 |
| 2,800,465 | 7/1957 | Nelson et al. | 260—87.5 |
| 2,967,855 | 1/1961 | Lang | 260—95 |
| 3,141,870 | 6/1964 | Deex | 260—86.7 |

FOREIGN PATENTS

| | | |
|---|---|---|
| 209,392 | 7/1957 | Australia. |
| 467,383 | 8/1950 | Canada. |

JOSEPH L. SCHOFER, *Primary Examiner.*

MILTON STERMAN, J. R. LIBERMAN, DONALD E. CZAJA, LEON J. BERCOVITZ, *Examiners.*